Aug. 8, 1950     D. W. EPSTEIN     2,517,774
HALATION REDUCTION IN CATHODE-RAY TUBES
Filed March 30, 1948     2 Sheets-Sheet 1
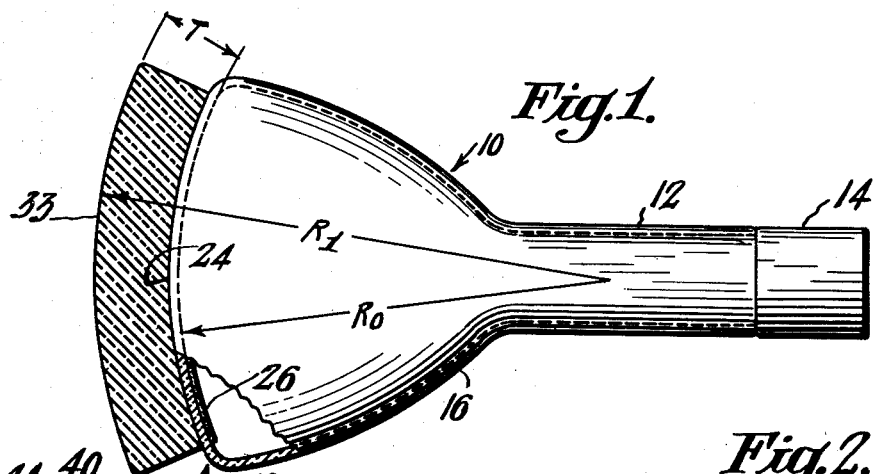
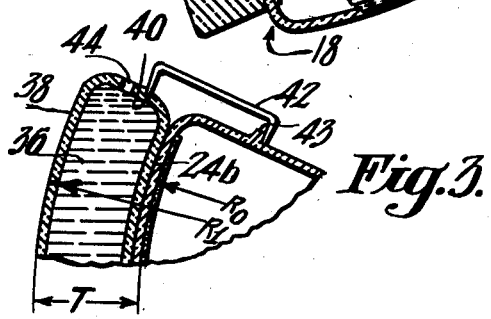 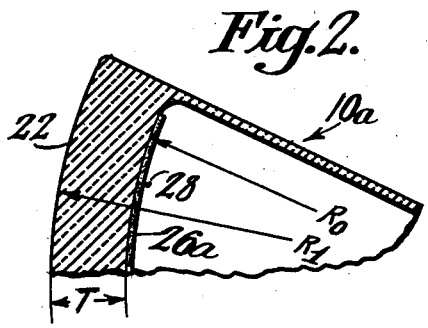
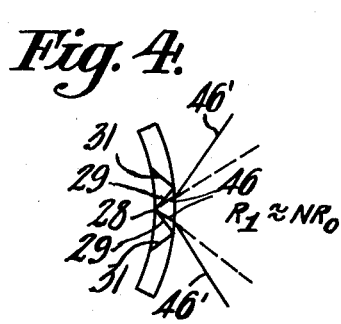 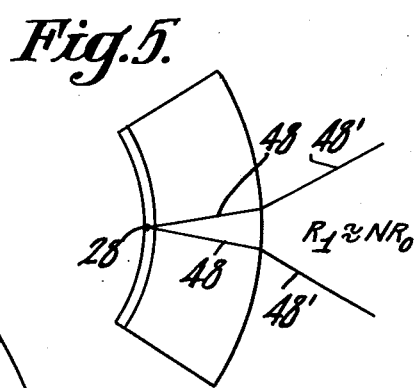
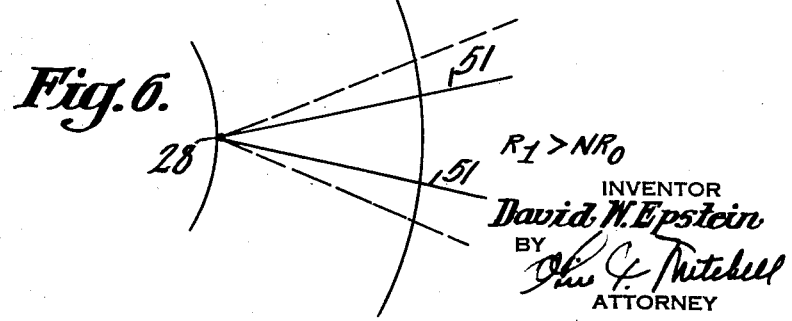
INVENTOR
David W. Epstein
BY
ATTORNEY Aug. 8, 1950 — D. W. EPSTEIN — 2,517,774
HALATION REDUCTION IN CATHODE-RAY TUBES
Filed March 30, 1948 — 2 Sheets-Sheet 2
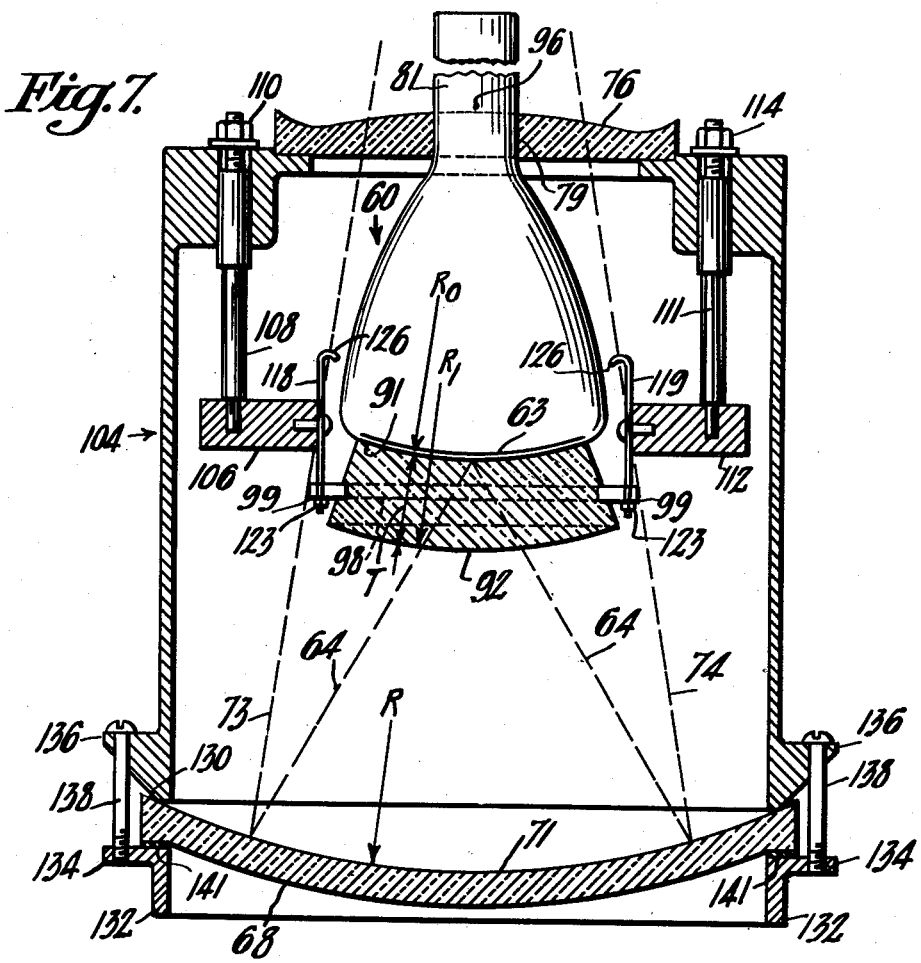
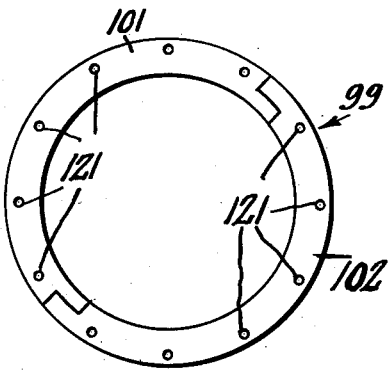
INVENTOR
David W. Epstein
ATTORNEY Patented Aug. 8, 1950

2,517,774

UNITED STATES PATENT OFFICE 2,517,774

HALATION REDUCTION IN CATHODE-RAY TUBES

David W. Epstein, Princeton, N. J., assignor to Radio Corporation of America, a corporation of Delaware Application March 30, 1848, Serial No. 17,967

16 Claims. (Cl. 178—7.5)

The present invention relates to methods of and apparatus for substantially eliminating the effects of internal reflection in an optical element or elements of an optical device, and, more particularly, but not necessarily exclusively, to novel methods for providing an optical element or combination of elements having negligible total reflection and to novel means for providing optical devices which are substantially free of aberrations caused by reflection and which, therefore, have an increased luminous flux output.

In accordance with the invention the reflections at the boundary between optical media are so directed as not to be again reflected in directions which confuse the significant rays to be directed through the optical boundary. Moreover, the significant rays are directed in a manner to increase the total perceptible light. The invention is especially applicable to a device in which a light emitter is in optical contact with a surface of an optical member. For example, the phosphor of a cathode ray tube is a light emitter which is spread upon the interior face of the transparent tube end. The cathode ray tube face in this instance is a surface of a light transmitting member.

Where a luminous optical image is to be viewed or projected, the invention provides a more brilliant image substantially free of the loss of contrast due to halation. An image produced by apparatus embodying the invention has higher contrast ratios than apparatus which lacks the improvements set forth herein.

With the present invention the use of low reflecting films in conjunction with cathode ray tubes becomes of value. A more detailed discussion of this aspect of the invention will be given hereinafter.

In one of its aspects, the invention is discussed herein as being embodied in a system for projecting television pictures or the like, in which the optical system is of the type comprising a spherical mirror and an aspheric correcting plate. As explained in Patent No. 2,273,801, granted to Daniel O. Landis, February 17, 1942, it has been found that a large television image can be projected with sufficient illumination and with good definition by employing a specially designed optical system of the above-mentioned type. When the invention is employed in conjunction with an optical system of the type discussed and claimed in the Landis patent, an improved optical system and improved results will be obtained as will hereinafter appear.

The principal object of the present invention is to provide for the substantial elimination of total internal reflection thereby eliminating halation.

Another and closely related object is to reduce halation and increase the light output of an optical system or device.

A further object of the invention is to provide a cathode ray tube face which has negligible total reflection thereby to reduce halation and increase light output.

A still further object of the invention is to provide for the production of television images with higher contrast ratios than images produced without the aid of the present invention.

A still further object of the invention is to provide a novel and improved optical system of the type employing a spherical mirror in which the optical efficiency of the system is enhanced.

Other objects and advantages of the invention will, of course, become apparent and immediately suggest themselves to those skilled in the art to which the invention is directed from a reading of the following specification in connection with the accompanying drawings in which:

Fig. 1 is a side elevational view partly in section of a cathode ray tube embodying the invention in one form;

Fig. 2 is a fragmentary view of a modified cathode ray tube constructed in accordance with the invention;

Fig. 3 is a fragmentary view in section of a further modification of a cathode ray tube embodying the invention;

Figs. 4 to 6 are diagrams which are referred to in describing principles of the invention;

Fig. 7 is a view in sectional elevation of a projection optical system in accordance with the invention showing details of the several parts thereof, the sections being taken through the center;

Fig. 8 is a top plan view of a part of the apparatus of Fig. 7.

Fig. 1 of the drawings is partly illustrative of the invention and the principles thereof. This figure of the drawings discloses the invention as being embodied in a cathode ray tube designated generally by the reference character 10. This tube comprises a neck portion 12, a suitable connection base 14, a bulb 16, and a tube end designated generally by the reference character 18. Fig. 2 of the drawings is similar to Fig. 1 but illustrates the invention as applied in modified form to a cathode ray tube 10a having a one-piece tube end 22 constructed in accordance with the invention.

As shown in Fig. 1 the tube end 18 comprises an exposed tube face 24 of suitable transparent material such as Pyrex glass. The interior surface of the tube face 24 is coated in the usual manner with a luminescent or phosphorescent material 26 which emits light when excited by an electron beam directed from an electron gun (not shown) located adjacent to the end of the tube neck 12.

In cathode ray tubes of the more usual construction for example, such as shown fragmentarily in Fig. 4 of the drawing, about 50% of the light directed toward the viewer, or toward a light receiving device, is totally reflected by the glass-air interface of the tube. For example, a luminous point 28 (Fig. 4) provides rays 29 which suffer total internal reflection. This totally reflected light is rescattered by the luminescent screen as at points 31 lying on a circle causing the well-known halation effect.

In accordance with the present invention the tube end, as in Fig. 2, is in the form of a concentric meniscus having two approximately concentric portions of a sphere and is of a thickness T, approximately given by the relation $$T = \frac{N-1}{N} R_1 \text{ or } R_1 = NR_0$$

In applying this formula, the discovery of which is a fundamental basis for the present invention, $R_0$ is the radius of curvature of the inner face of a transparent optical member 33 having the thickness T. This optical member 33 is in reality a novel anti-halation lens.

If the index of refraction of the bulb end is approximately equal to that of the optical member, then the bulb end may be of any thickness since T will be the total thickness of the bulb end and the member 33.

In Fig. 2 the thickness T of the tube end 22 corresponds to the thickness T of the optical member 33 of Fig. 1 if the bulb end has approximately the same index of refraction as the member 33. N is the index of refraction of the medium contained within the two spherical portions having radii of curvatures $R_1$ and $R_0$. These two spherical portions are concentric or approximately so as shown in Fig. 1 of the drawings.

The optical member 33 may be in the form of a thick piece of molded transparent plastic in optical contact with tube face 24. By way of example, the tube 10 or the end of the bulb 16 of the tube 10 may be of Pyrex glass. The optical member 33, which is an anti-halation lens, may be made of methyl methacrylate. Optical contact in Fig. 1 may be insured by using an oil such as clear mineral oil or Canada balsam.

Fig. 3 of the drawings shows a still further modification in which the thickness T of the effective transparent medium is provided by a liquid 36 confined between the tube face 24b, the inner surface of which has a radius of curvature of $R_0$, and a spherical shell 38 having an outer radius $R_1$. The shell 38, of glass or of a suitable plastic such as methyl methacrylate, may be clamped, as indicated by a clip 42 to the tube or tube holder. A series of clips 42 may be employed to fit over projections 43 and into a groove 40. The filling liquid of index of refraction N may be introduced through an opening 44 which is thereafter sealed in any known manner. This liquid may be clear mineral oil.

In each of Figs. 1, 2 and 3 a cathode ray tube (or portion thereof) is shown in which the entire envelope is made of glass. The present invention, however, is applicable to different constructions as, for example, tubes wherein the neck and conical portions are made of metal with a glass or transparent end portion fused or otherwise attached to the end of the tube envelope.

The dimension T in Figs. 1, 2 and 3 is preferably such that $R_1$ is equal to or is slightly greater than $NR_0$. Where the effective or total thickness T is such that the relationship $R_1 \geq NR_0$, then there is no total reflection and, therefore, an increase in useful light output results and there is no halation. If the dimension T is appreciably less than that dictated by the relationship $$T = \frac{N-1}{N} R_1$$

there is total reflection the amount of which increases with increasing departure from the relationship set forth herein. The consequent disturbing effect of halation increases in like manner.

Referring to Fig. 4, there is shown the thin tube face of the prior art in which $R_1$ is approximately equal to $R_0$. Rays 46 at the glass-air interface are refracted as indicated by 46'. The halation effect was discussed above. Fig. 5 shows a tube face embodying the invention, in which $R_1$ is approximately equal to $NR_0$. In this instance, rays 48 from the corresponding luminous spot 28 are not so divergent as indicated by the rays 48'. Fig. 6 of the drawings shows an optical situation wherein the relationship, $R_1$ is greater than $NR_0$ holds. In this figure of the drawings the divergence of the emergent rays 51 is not appreciably increased at the air-glass interface.

With the smaller angles of incidence at the outer surface due to practice of this invention, a low reflecting film will eliminate most of the Fresnel reflection occurring at this surface.

In the ordinary tube end a low reflection film will eliminate only those rays which strike the outer surface at low angles of incidence and therefore a low reflection film will eliminate only a small percentage of the Fresnel reflection. These low reflecting films are by now well known.

Figs. 7 and 8 of the drawings show the invention as applied to a projector of the type mentioned above which includes a spherical mirror and an aspherical correcting plate. The general organization of the television projection system comprises an image producing tube 60 which has a television image produced on its luminescent target 63. The television image is projected along an optical path, conventionally represented at 64 toward a reflecting element 69 which has a spherical reflecting surface 71. The image which has been projected upon the reflecting surface 71 is then reflected therefrom along the optical paths conventionally represented at 73 and 74 toward a suitable viewing screen (not shown). At an intermediate point in the optical path an aspheric zone plate 76 (also termed a "correcting plate" or "correcting lens") is positioned to receive the light reflected from the reflecting surface 71. The correcting plate 76 is arranged externally to the light path from the tube to the reflector and is axially aligned with each. The anti-halation lens 92 precorrects for some of the spherical aberration introduced into the lights rays by the curved reflecting surface 71, and the correcting plate 76 is so figured as to correct for any of the remaining spherical aberration introduced by the curved reflecting surface 71 of the member 78 so that a sharply focused reproduction of the image developed on the fluorescent or luminescent target area 63 of the tube 60 is produced on the previously mentioned viewing screen. The correcting plate 76 has a central opening 79 for the purpose of accommodating the tube neck 81 and, if desired, the deflecting yoke (not shown) for the producing deflection of the cathode ray beam within the tube 60.

The curved target face 63 of the tube 60 is received by and seats upon the inner concave surface 91 of a transparent optical member 92 which is constructed like the member 33 of Fig. 1 of the drawings.

Good optical contact is necessary and may be achieved by the use of oil, Canada balsam or the like as pointed out above. The target face 63 of the tube 60 will be approximately spherical or exactly spherical, and its center is indicated at 96 on Fig. 8.

The supporting arrangement for the correcting plate and the member 92 which in turn carries the tube 60 will now be described in detail. The member 92 is provided with a groove 98 which receives a two-part ring member 99 (Fig. 8). The parts 101 and 102 of the ring member 99 are readily separated so that the ring member may be seated in the groove 98 to hold the optical member 92 in position. The correcting plate 76 as well as the ring member 99 are located and supported through the agency of a cylindrical member 104. A bracket 106 carried at the end of a rod 108 serves as one of the supports for the ring member 99. The rod 108 is slidable in its mounting hole to be axially adjustable and is held in a selected position by a nut 110. A second rod 111 and bracket 112 are provided which is also adjustable by turning a nut 114. The brackets 106 and 112 are flattened or otherwise formed to receive ring carrying members 118 and 119. The ring member 99 is provided with a series of holes 121 in diametrically opposite pairs which will receive the threaded ends of the members 118 and 119. Nuts 123 may be provided to hold the parts of the ring member 99 securely in place. The upper end of the ring carrying members 118 and 119 extend upwardly and adjacent to the outer surface of the bulb of the tube to serve as corona shields. These ring carrying members may be curved as indicated at 126 so as to more effectively function. The remaining holes 121 and the ring member 99 may also carry a series of members similar to the members 118 and 119 so as to extend the corona shield protection entirely around the bulb of the tube.

From the arrangement just described for placing and mounting the optical member 92, it will be understood that the tube 60 may merely be seated upon this member in optical contact insured by oil or Canada balsam as suggested. However, if desired, the tube face 63 may be cemented to the surface 91 of the member 92 so that each tube which is to be placed in the projector assembly will always be accompanied by its optical member 92. With this suggested procedure, in order to change tubes it will be necessary to demount or at least partially demount the ring member 99.

The correcting plate 76 is seated in a recess 121 which is coaxial with the ring member 99 and the spherical mirror 68. The mirror 68 is or may be mounted as shown by having the ring-shaped end 130 of the cylindrical member 104 seated upon the reflecting surface 71 of the mirror. The cylindrical member or housing 104 is clamped upon the reflecting surface of the mirror and this reflecting surface in turn is clamped in a desired position by means of a ring 132 provided with a flange 134. An annular projection 136 provided on the cylindrical member is appertured as by drilling at intervals to accommodate clamping bolts 138. A gasket or washer 141 of yielding material provides for cushioning the member 132 at its clamping edge.

The member 92 is in the form of a meniscus lens in optical contact with the cathode ray tube face 63. By properly choosing the radii of curvatures $R_0$ and $R_1$ and the thickness T of the lens, not only can total reflection be eliminated which would limit image contrast, but the amount of luminous flux which strikes the spherical mirror can be increased.

With a given radius of curvature R of the mirror and a given magnification, the use of a meniscus lens, as taught by this invention, requires a greater tube curvature and a weaker correcting lens than an optical system such as is discussed in the Landis patent mentioned above. The greater tube curvature and the weaker correcting lens are both desirable. With regard to the correcting lens the figure in its surface is easier to grind, if it is weaker, that is to say if it departs but very little from an ideal plane.

Theoretically a good design gives $$R_0 = .53 \frac{2N-1}{N^2} R$$

$$R_1 = N R_0$$

where N is the index of refraction of the material of the member 92 which is the anti-halation lens.

What I claim is:

1. A cathode ray device comprising a tube having a transparent front wall structure, luminescent material disposed in the form of a layer on the inside surface of the wall structure, said wall structure serving as a concentric meniscus having a thickness so related to the radius of curvature of the inside surface and the radius of curvature of the outside surface thereof that the radius of curvature of the outside surface is substantially equal to or greater than the index of refraction of the wall material contained between the spherical surfaces multiplied by the radius of curvature of the inside surface.

2. A cathode ray device comprising a tube having a transparent front wall structure, luminescent material disposed in the form of a layer on the inside surface of the wall structure, said wall structure serving as a concentric meniscus having a thickness so related to the radius of curvature of the inside surface and the radius of curvature of the outside surface thereof that the radius of curvature of the outside surface is substantially equal to the index of refraction of the wall material contained between the spherical surfaces multiplied by the radius of curvature of the inside surface.

3. A cathode ray device comprising a tube having a transparent front wall structure, luminescent material disposed in the form of a layer on the inside surface of the wall structure, said wall structure serving as a concentric meniscus having a thickness so related to the radius of curvature of the inside surface and the radius of curvature of the outside surface thereof that the radius of curvature of the outside surface is equal to or greater than .75 times the index of refraction of the wall material, times the radius of curvature of the outer spherical surface of the meniscus.

4. A cathode ray device comprising a tube having a transparent front wall structure with a given index of refraction N, luminescent material disposed in the form of a layer on the inside surface of the wall structure, said wall structure serving as a concentric meniscus having a thickness such that the thickness of the wall structure T is equal to $$\frac{N-1}{N}R_1$$

in which $R_1$ is the radius of the outer concentric boundary of the meniscus.

5. A cathode ray device comprising a tube having a transparent composite front wall structure, luminescent material disposed in a form of a layer on the inside surface of the wall structure, the composite wall structure serving as a concentric meniscus having a thickness so related to the radius of curvature of the inside surface and the radius of curvature of the outside surface thereof that the radius of curvature of the outside surface is equal to or slightly greater than the index of refraction of the optical components of the wall material contained between the spherical surfaces multiplied by the radius of curvature of the inside surface.

6. In a cathode ray tube having an envelope providing a composite transparent face in the form of a meniscus, said composite face comprising a portion of the envelope, means to contain a transparent liquid seated against said portion of the envelope, said meniscus having concentric spherical surfaces, a luminescent material distributed on said inner spherical surface, the radii of said concentric spherical surfaces differing in magnitude by an amount such that the light produced upon excitation of any point on the luminescent screen is transmitted by the outer surface of the meniscus without total reflection.

7. In a cathode ray tube having an envelope providing a composite transparent face in the form of a meniscus, said composite face comprising a portion of the envelope, a separate transparent member forming part of said face and being seated against and secured to said portion of the envelope, said meniscus having concentric spherical surfaces, a luminescent material on said inner spherical surface the radii of said concentric spherical surfaces differing in magnitude by an amount such that the light produced upon excitation of any point on the luminescent screen is transmitted by the outer surface of the meniscus without total reflection.

8. A cathode ray tube having an envelope and a transparent face of unitary construction, said face being in the form of a concentric meniscus, the inner and outer radii of said meniscus differing by an amount to provide a face thickness insuring that the light produced upon excitation of any point on the luminescent screen is transmitted by the outer surface of the meniscus without total reflection.

9. The cathode ray tube of claim 8 in which the face is composed of a portion of the tube envelope optically combined with a separate optical member in intimate interfacial optical contact with said transparent face.

10. The cathode ray tube of claim 9 is which the separate optical member is composed of a transparent moldable plastic having an index of refraction substantially the same as the index of refraction of the transparent tube face.

11. The cathode ray tube of claim 9 in which said separate optical member is in the form of a transparent shell having transparent opposed spherical faces, said shell being capable of containing a liquid, said liquid and said shell having substantially the same index of refraction as the transparent tube face.

12. A cathode ray tube having an envelope and a transparent face of unitary construction, said face being in the form of a concentric meniscus, the inner and outer radii of said meniscus having a relationship such that the radius of the outer face of the meniscus is equal to or slightly greater than the index of refraction of the wall material contained between the spherical surfaces of the meniscus multiplied by the radius of curvature of the inside surface of the meniscus.

13. The cathode ray tube of claim 12 in which the face is composed of a portion of the tube envelope optically combined with a separate optical member in intimate interfacial optical contact with said transparent tube face.

14. The cathode ray tube of claim 13 in which the separate optical member is composed of a transparent moldable plastic having an index of refraction substantially the same as the index of refraction of the transparent tube face.

15. The cathode ray tube of claim 13 in which said separate optical member is in the form of a transparent shell having transparent opposed spherical faces, said shell being capable of containing a liquid, said liquid and said shell having substantially the same index of refraction as the transparent tube face.

16. A projection system comprising a concave spherical mirror having a radius R, a correcting plate having a figured surface positioned to receive light reflected from said spherical mirror, a projection tube for projecting light to said mirror, said projection tube having an end in the form of a concentric spherical meniscus having an index of refraction N, the inner radius $R_0$ of the meniscus being substantially given by the formula $$R_0 = .53\frac{2N-1}{N^2}R$$

and the outer radius $R_1$ of the meniscus being substantially given by the formula $R_1 = NR_0$ whereby the effect of said meniscus permits the figured surface of said correcting plate to be weaker and the curvature of the exposed tube face is permitted to be greater.

DAVID W. EPSTEIN.

REFERENCES CITED

The following references are of record in the file of this patent:

UNITED STATES PATENTS

| Number | Name | Date |
|---|---|---|
| 2,093,288 | Ogoblinsky | Sept. 14, 1937 |
| 2,293,529 | Bedford | Aug. 18, 1942 |
| 2,298,808 | Ramberg | Oct. 13, 1942 |
| 2,312,206 | Calbich | Feb. 23, 1943 |
| 2,346,810 | Young | Apr. 18, 1944 |

FOREIGN PATENTS

| Number | Country | Date |
|---|---|---|
| 436,543 | Great Britain | Oct. 14, 1935 |